United States Patent [19]

Rohrka et al.

[11] Patent Number: 5,221,569
[45] Date of Patent: Jun. 22, 1993

[54] SAIL FOR SPORTS EQUIPMENT, IN PARTICULAR WINDSURFING SAIL, COMPRISED OF POLYESTER FILM

[75] Inventors: Heinz-Werner Rohrka, Kiedrich; Harald Hessberger, Idstein; Guenter Schmah, Mainz-Gonsenheim, all of Fed. Rep. of Germany

[73] Assignee: Hoechst Aktiengesellschaft, Frankfurt am Main, Fed. Rep. of Germany

[21] Appl. No.: 495,991

[22] Filed: Mar. 20, 1990

[30] Foreign Application Priority Data

| Mar. 22, 1989 | [DE] | Fed. Rep. of Germany ... 8903609[U] |
| Mar. 22, 1989 | [DE] | Fed. Rep. of Germany ... 8903610[U] |
| Sep. 2, 1989 | [DE] | Fed. Rep. of Germany ... 8910497[U] |
| Sep. 2, 1989 | [DE] | Fed. Rep. of Germany ... 8910498[U] |
| Sep. 4, 1989 | [DE] | Fed. Rep. of Germany ... 8910535[U] |
| Sep. 4, 1989 | [DE] | Fed. Rep. of Germany ... 8910536[U] |

[51] Int. Cl.$^5$ .............................................. B32B 7/02
[52] U.S. Cl. ................................. 428/215; 428/474.7; 428/475.2; 428/480; 428/483; 428/516; 428/518; 428/520
[58] Field of Search ............... 428/480, 516, 215, 483, 428/474.7, 475.2, 520, 518

[56] References Cited

U.S. PATENT DOCUMENTS

| 3,871,947 | 3/1975 | Brekken | 161/116 |
| 4,006,123 | 2/1977 | Samuelson | 428/373 |
| 4,945,848 | 8/1990 | Linville | 428/110 |
| 5,061,553 | 10/1991 | Olsen | 428/516 |

FOREIGN PATENT DOCUMENTS

| 056657 | 7/1982 | European Pat. Off. . |
| 0227922 | 7/1987 | European Pat. Off. . |
| 281322 | 9/1988 | European Pat. Off. . |
| 8903609 | 6/1989 | Fed. Rep. of Germany . |
| 8910535 | 11/1989 | Fed. Rep. of Germany . |
| 2207804 | 6/1974 | France . |

*Primary Examiner*—Edith Buffalow
*Attorney, Agent, or Firm*—Foley & Lardner

[57] ABSTRACT

A sail for sports equipment, in particular a windsurfing sail, comprising a multilayered composite film comprising a stretch-oriented and heat-set polyester film preferably made of polyethylene terephthalate, and at least one plastics layer of polyolefin, polyamide, polyester, polyvinyl chloride or fluorocarbon resin applied to at least one of the two surfaces of said polyester film.

24 Claims, No Drawings

SAIL FOR SPORTS EQUIPMENT, IN PARTICULAR WINDSURFING SAIL, COMPRISED OF POLYESTER FILM

BACKGROUND OF THE INVENTION

The present invention relates to a sail based on a multilayer composite film comprising a stretch-oriented, heat-set polyester film, in particular polyethylene terephthalate film.

The sail can be used for sports equipment which move on land, on water or in the air by means of wind energy. Sports equipment of this type includes, for example, beach gliders, sail boats, windsurfing boards, sail planes, hang gliders, ultralight planes and balloons.

Multilayered sails, in particular windsurfing sails, comprised of a biaxially stretch-oriented and heat-set polyester film which is adhesive-bonded to a fiber fabric, are known from EP-A-0,227,922. In contrast to sails made of woven fabrics, the sail films disclosed therein are airtight and result in an increased thrust. Moreover, the material is particularly well-suited for use as sails because of its high tear resistance.

Windsurfing sails made of plastic film, however, are subject to rapid aging and tend to become brittle when being frequently used. In particular, they exhibit an unsatisfactory resistance to tear propagation.

SUMMARY OF THE INVENTION

It is therefore an object of the present invention to provide a sail, in particular a windsurfing sail, which is comprised of polyester film and exhibits improved mechanical strength, increased resistance to tear propagation, good UV-stability, high clearness, a low weight per unit area, and a reduced tendency to flutter during sailing as a result of unsatisfactory stiffness.

In accomplishing the foregoing object there is provided according to the present invention a sail constructed of a multilayered composite material comprising at least two layers, said layers comprising a stretch-oriented and heat-set polyester film which is bonded on a least one surface to at least one plastic layer, wherein said plastic is selected from the group consisting of polyolefin, polyamide, polyester, polyvinylchloride and fluorocarbon resin.

Another embodiment of the present invention provides for a sail constructed of a multilayered composite material comprising at least three layers, wherein one layer comprises a non-woven fabric.

Further objects, features and advantages of the present invention will become apparent from the detailed description of preferred embodiments that follows.

DETAILED DESCRIPTION OF THE PREFERRED EMBODIMENTS

The sail preferably is a sail for windsurfing boards, but it is also suitable for any other type of sports equipment where wind energy is used for locomotion.

The sail comprises a multilayered composite material comprising at least two plastic films, one of these films being a biaxially stretch-oriented and heat-set polyester film. The polyester is a polyester homopolymer or a copolyester or a mixture of various polyesters or a mixture of polyester and other polymers, in particular polyethylene terephthalate (PETP). The polyester film can be a monolayered film or comprise several coextruded layers, the difference between the individual layers essentially residing in their content of different additives and/or in varying combinations of raw materials.

One or both surface(s) of the polyester film is (are) provided with a plastic layer comprised of polyolefin, polyamide, polyester or polyvinyl chloride. These layers expediently are stretch-oriented plastic films which are adhesive-bonded to the polyester film or coextruded with the latter.

In another embodiment, the plastic layer is comprised of a fluorocarbon resin, which is preferably based on polytetrafluoroethylene and particularly preferably on tetrafluoroethylene/ethylene copolymer (ETFE). The molar ratio of the two monomers in the particularly preferred ETFE is between about 4:6 and 6:4. This fluorocarbon resin layer may contain up to about 50% by weight, preferably between about 5 and 35% by weight, of polyester, preferably polyethylene terephthalate, in admixture with the fluorocarbon polymer(s).

This plastic layer is not stretch-oriented and not heat-set, but is bonded to the polyester film without any further post-treatment after melt extrusion and cooling down. It is also possible for the polyolefin layer to be applied to the polyester film by extrusion coating, and it is then neither stretch-oriented nor heat-set.

A preferable polyolefin comprises units of alpha-olefins having 2 to 6 carbon atoms, preferably it is a homo- or copolymer containing units of ethylene and/or propylene, of the type described in EP-A-0,227,922 as thermoplastic synthetic material for the production of sails. The density of the stretch-oriented and of the non-stretch-oriented polypropylene film preferably is about 0.90 to 0.92 g/cm$^3$, the density of the polyethylene film preferably is about 0.89 to 0.96 g/cm$^3$. The polyolefin film may be a monolayer film or comprise several coextruded layers comprised, for example, of HDPE/LDPE or LLDPE/LDPE. The polyamide is preferably polyamide-6, polyamide-6.6, polyamide 12 or mixtures of these polyamides. If the further plastic layer is a polyester layer, said polyester preferably is polyethylene terephthalate (PETP).

In an embodiment exhibiting particularly satisfying mechanical properties the film according to this invention is comprised of the biaxially stretch-oriented and heat-set polyester film carrying the polyolefin layer on one or both surfaces. The polyolefin layer or one of the two olefin layers is bonded to a non-woven fabric, so that the resulting composite film is either a three-layered ABC composite or a four-layered BABC composite. Layer A is comprised of the polyester film, layer(s) B is/are comprised of the polyolefin, and layer C is comprised of the non-woven fabric. The polyolefin layer need not necessarily be stretch-oriented and heat-set. In general, it is bonded to the polyester film by melt extrusion or by means of an adhesive.

The non-woven fabric comprises fibers and/or filaments of polyester, particularly PETP, or of polyolefin, particularly of those olefins mentioned above as preferable materials for the polyolefin layer. Non-wovens preferable for the purposes of this invention are random non-wovens, i.e., sheet-like structures where a multitude of fibers or filaments of identical or different lengths are superposed in a purely statistical manner, i.e., without a preferential directional alignment. Coherence of the sheet-like structure is achieved by self-adhesion of the fibers as a result of appropriate preparation or crimping and/or by calendering and/or by binders. Random non-wovens of the above type can be prepared in different ways, for example, mechanically by calendering or carding, aerodynamically by air transport and deposition with suction on air-tight supports, hydrodynamically by suspending short-staple, preferably synthetic fibers in water with an addition of binder, applying the fibers onto a sieve and drying, and finally by extruding filaments through one or several spin nozzles and directly depositing them on a transport belt, followed by matting by needling or calendering and/or with the aid of binders.

The advantages of the non-wovens employed for producing the composite material of the present invention in particular reside in their excellent tear strength and resistance to tear propagation and in a particularly high resistance to continuous thermal and chemical influences and to weathering.

The sail preferably comprises two, three or four layers. Adhesive layers which may be present are considered to be outside the scope of the present definition of layers due to their comparatively low thickness of less than 5 μm, in particular of 3 μm or less. In the case of a three-layered structure the stretch-oriented polyester film forms the central layer, and the two outer layers can be comprised of different, preferably of identical plastic materials. Four-layered sails have a ABAB structure or a ABAC structure, whereby layers A are comprised of the stretch-oriented polyester film and layers B and C are comprised of the further plastic materials.

The stretch-oriented polyester film in general has a thickness of 12 to 200 μm, preferably of 20 to 150 μm, and particularly preferably of 25 to 100 μm, the layer of plastic material bonded thereto in general has a thickness of 20 to 150 μm, preferably of 25 to 100 μm. The total thickness of a two-layered composite film comprising these layers is at least 40 μm, preferably 50 to 350 μm, and particularly preferably 80 to 300 μm.

The multilayered composite film is, for example, produced by mutual bonding of the individual films, the surfaces of which are coated with a UV-resistant adhesive which may have been applied in solid form or as a dispersion or solution. Preferable adhesives for this purpose are, in particular, two-component adhesives comprising, for example, a polyester urethane compound which is crosslinked with a multifunctional isocyanate. It is also possible for the layers comprising polyolefin and fluorocarbon polymers to be applied to the polyester film by extrusion coating. In this process an improved composite adhesion to the polyester film is accomplished as a result of the superficial oxidation of the hot polyolefin melt upon exposure to the ambient air. In this case, the polyolefin layer is not stretch-oriented.

The calendering process presents another possibility of producing the composite film. In this process, the individual layers are simultaneously conveyed into a roller nip where they are pressed under the action of heat. The temperature range is 150° C. to 250° C. The line pressure to be applied in the calendering process is in the range of 400 to 1,200 N/cm.

If the composite film is produced from individual films, the films are printed prior to being bonded together, it being possible for the prints to be present on an outer surface or on an intermediate surface. The individual films and/or the adhesive layer(s) may also be dyed by incorporating appropriate colorants. Where appropriate, the individual films contain UV-absorbing substances such as, for example, those described in EP-A-0,227,922 for thermoplastic materials. The non-woven is directly bonded to the polyolefin layer, i.e., without an intermediate layer, bonding being performed at an increased pressure of between 1 and 3 bar and an increased temperature, in particular of between 100° and 300° C. The pressing time is relatively short and does not exceed a few seconds.

The following are exemplary layer build-ups for the sails according to the present invention. In all cases, the poly-ethylene terephthalate films are oriented by biaxial stretching and heat-set.

1. A monolayered or coextruded multilayered PETP film (maximum density 1.4 g/cm$^3$), an adhesive layer and a monolayered or coextruded multilayered PETP film (maximum density 1.4 g/cm$^3$). Thickness of each of the two films 12 to 120 μm, total thickness of the composite film 50 to 245 μm.

2. A monolayered or coextruded multilayered PETP film (density less than/equal to 1.4 g/cm$^3$, thickness 12 to 120 μm) an adhesive layer and a monolayered or coextruded multilayered, biaxially stretch-oriented polypropylene film (BOPP), (density 0.91 g/cm$^3$, thickness 20 to 50 μm), total thickness of composite film 50 to 175 μm.

3. A monolayered or coextruded multilayered polyethylene film (PE) (density 0.89 to 0.96 g/cm$^3$, thickness 20 to 50 μm), an adhesive layer, a monolayered or coextruded multilayered PETP film (maximum density 1.4 g/cm$^3$, thickness 12 to 120 μm), an adhesive layer, a monolayered or coextruded multilayered PE film (density 0.89 to 0.96 g/cm$^3$, thickness 20 to 50 μm), total thickness of composite film 54 to 230 μm.

4. A monolayered or coextruded multilayered polypropylene film (UPP) (density 0.90 to 0.92 g/cm$^3$, thickness 20 to 50 μm), an adhesive layer, a monolayered or coextruded multilayered PETP film (density less than/equal to 1.4 g/cm$^3$, thickness 12 to 120 μm), an adhesive layer, and a monolayered or coextruded multilayered UPP film (density 0.90 to 0.92 g/cm$^3$, thickness 20 to 50 μm), total thickness of the composite film 54 to 230 μm.

5. A monolayered polyamide film (PA) (thickness 20 to 50 μm, made of PA 6, PA-6.6 or PA 12), an adhesive layer, a monolayered or coextruded multilayered PETP film (thickness 12 to 120 μm), an adhesive layer and a monolayered polyamide film (thickness 20 to 50 μm, made of PA 6, PA-6.6 or PA 12), total thickness of the composite film 54 to 230 μm.

6. A monolayered PVC film (density 1.2 to 1.4 g/cm$^3$, thickness 30 to 50 μm), an adhesive layer, a monolayered or coextruded multilayered PETP film (thickness 12 to 120 μm), an adhesive layer and a monolayered PVC film (density 1.2 to 1.4 g/cm$^3$, thickness 30 to 50 μm), total thickness of the composite film 74 to 230 μm.

7. A monolayered or coextruded multilayered PETP film (thickness 12 to 150 μm), an adhesive layer, a mono-layered or coextruded multilayered PE film (density 0.89 to 0.96 g/cm$^3$, thickness 20 to 50 μm), an adhesive layer, a monolayered or coextruded multi-layered PETP film (thickness 12 to 150 μm), an adhesive layer and a monolayered or coextruded multi-layered PE film (density 0.89 to 0.96 g/cm$^3$, thickness 20 to 50 μm), total thickness of the composite film 67 to 415 μm.

8. A monolayered or coextruded multilayered PETP film (thickness 12 to 150 μm), an adhesive layer, a mono-layered or coextruded multilayered UPP film (thickness 20 to 50 μm), an adhesive layer, a monolayered or coextruded multilayered PETP film (thickness 12 to 150 μm), an adhesive layer and a monolayered or coextruded multilayered UPP film (thickness 20 to 50 μm), total thickness of the composite film 67 to 415 μm.

9. A monolayered or coextruded multilayered PETP film (maximum density 1.4 g/cm$^3$, thickness 12 to 150 μm), an adhesive layer and a monolayered ETFE film (density 1.70 to 1.80 g/cm$^3$, thickness 25 to 150 μm), total thickness of the composite film at least 50 μm.

10. A monolayered or coextruded multilayered PETP film (maximum density 1.4 g/cm$^3$, thickness 12 to 150 μm), an adhesive layer and a monolayered film comprised of a PETP/ETFE mixture (weight ratio 30 parts by weight:70 parts by weight, density 1.4 to 1.75 g/cm$^3$, thickness 25 to 150 μm), total thickness of the composite film at least 50 μm.

11. A monolayered or coextruded multilayered PETP film (maximum density 1.4 g/cm$^3$, thickness 25 to 100 μm), an adhesive layer on each of the two surfaces thereof, and a monolayered ETFE film (density 1.70 to 1.80 g/cm$^3$, thickness 25 to 100 μm) on top of each adhesive layer, total thickness of the composite film at least 52 μm.

12. A monolayered or coextruded multilayered PETP film (maximum density 1.4 g/cm$^3$, thickness 12 to 150 μm), an optional adhesive layer, a monolayered or coextruded multilayered PE film (density 0.89 to 0.96 g/cm$^3$, thickness 20 to 100 μm) or PP film (density 0.90 to 0.92 g/cm$^3$, thickness 20 to 100 μm), and a non-woven fabric comprising PETP fibers or polyolefin fibers (weight per unit area 10 to 200 g/m$^2$).

The invention is explained in greater detail by means of the Examples which follow, the thickness of the adhesive layers being about 0.8 to 3 μm in each case.

EXAMPLE 1: SAIL HAVING FILM BUILD-UPS AA

Two monolayered, biaxially stretch-oriented and heat-set polyethylene terephthalate films having a thickness of 65 μm each were mutually bonded by means of an adhesive. The adhesive used was a UV-resistant two-component system on a polyurethane basis.

EXAMPLE 2: SAIL HAVING FILM BUILD-UPS AB

A monolayered, biaxially stretch-oriented and heat-set PETP film having a thickness of 50 μm was bonded, by means of an adhesive, to a monolayered, non-oriented 50 μm thick ETFE film (melting range 260° C. to 290° C.). The adhesive used was a UV-resistant two-component system on a polyurethane basis.

EXAMPLE 3: SAIL HAVING FILM BUILD-UPS BAB

Two monolayered, identical PE films (thickness 50 μm, density 0.905 g/cm$^3$) were bonded, by means of an adhesive, to the two surfaces of a monolayered, biaxially oriented, heat-set, 50 μm thick polyethylene terephthalate film. The adhesive used was a UV-resistant polyurethane system.

EXAMPLE 4: SAIL HAVING FILM BUILD-UPS ABAB

A four-layered composite material having the following layer build-ups was produced by bonding by means of an adhesive: A biaxially oriented, heat-set PETP film (thickness 50 μm), a PE film (thickness 35 μm), a biaxially oriented, heat-set PETP film (thickness 30 μm) and a PE film (thickness 35 μm).

EXAMPLE 5: SAIL HAVING FILM BUILD-UPS ABC

A monolayered, biaxially oriented and heat-set 75 μm thick PETP film was bonded, by means of an adhesive, to a monolayered 40 μm thick polyethylene film (density 0.92 g/cm$^3$). The adhesive used was a UV-resistant two-component system on a polyurethane basis. With the aid of calendering rollers the resulting composite film was bonded, at a temperature of 180° C. and a pressure of 800 N/cm, to a non-woven material comprised of PETP fibers (weight per unit area 40 g/m$^2$).

EXAMPLE 6: SAIL HAVING FILM BUILD-UPS BABC

Two monolayered identical PE films (thickness 50 μm, density 0.905 g/cm$^3$) were bonded, by means of an adhesive, to the two surfaces of a monolayered, biaxially stretch-oriented, heat-set PETP film having a thickness of 50 μm. The adhesive used was a UV-resistant polyurethane system. With the aid of calendering rollers the resulting composite film was bonded, at a temperature of 180° C. and a pressure of 800 N/cm, to a non-woven material comprised of PE fibers (weight per unit area 40 g/m$^2$).

Due to their specific build-ups the mechanical strength of the composite films could be improved compared to monofilms. Compared to known sails comprised of multilayered composite films, the composite films according to this invention also exhibited an improved resistance to weathering and an improved tear strength and tear propagation strength.

We claim:

1. A sail for sports equipment constructed of a multilayered composite material comprising at least two layers, the first of said layers comprising a stretch-oriented and heat-set monolayered or coextruded multilayered polyester film, wherein the polyester is a homopolymer or copolymer or a mixture of various polyesters or a mixture of polyester with other polymers, which is bonded to the second of said layers by means of an adhesive or by coextrusion, wherein said second layer comprises a monolayered or coextruded multilayered plastic film, wherein said plastic is selected from the group consisting of polyolefin, polyamide, polyester, polyvinyl chloride, and fluorocarbon resins.

2. The sail as recited in claim 1, wherein said plastic layer is selected from the group consisting of:
   polyamide film comprising polyamide-6, polyamide-6.6, polyamide-12 or a mixture thereof;
   polyolefin film comprising alpha-olefin units having 2 to 6 carbon atoms;
   polyester film comprising polyethylene terephthalate; and
   a film comprising polytetrafluoroethylene, tetrafluoroethylene/ethylene copolymer or a mixture thereof;
   said plastic layer being bonded to said polyester film by means of an adhesive or by coextrusion.

3. The sail as recited in claim 1, wherein said plastic layer has a thickness of about 20 to 150 μm, said polyester film has a thickness of about 12 to 200 μm, and the total thickness of said composite material is at least about 40 μm.

4. The sail as recited in claim 3, wherein said plastic layer has a thickness of about 25 to 100 μm, said polyester film has a thickness of about 20 to 150 μm, and the total thickness of said composite material is about 50 to 350 μm.

5. The sail as recited in claim 4, wherein said polyester film has a thickness of about 25 to 100 μm and the total thickness is about 80 to 300 μm.

6. The sail as recited in claim 1, wherein said plastic layer comprising polyolefin or fluorocarbon resin is bonded to said polyester film by melt-extrusion.

7. The sail as recited in claim 6, wherein said bonding is by calendering.

8. The sail as recited in claim 1, wherein said plastic layer comprises a fluorocarbon resin including an admixture of up to about 50% by weight polyester.

9. The sail as recited in claim 8, wherein said plastic layer comprises a fluorocarbon resin with an admixture of about 5 to 35% by weight polyester.

10. The sail as recited in claim 8, wherein said polyester comprises polyethylene terephthalate.

11. The sail as recited in claim 1, wherein said polyester film comprises polyethylene terephthalate film.

12. In a sporting device including a structure for carrying at least one person and a relatively larger body of flexible material attached to said structure to provide a motive-force-producing member, wherein said motive-force-producing member comprises a sail as defined by claim 1.

13. A sail as recited in claim 8, wherein said plastic is not heat-stretched or heat-set.

14. The sail as recited in claim 2, wherein said adhesive is used, wherein said adhesive comprises a two-component adhesive.

15. The sail as recited in claim 14, wherein said adhesive comprises a polyester urethane which is crosslinked with a multifunctional isocyanate.

16. The sail as recited in claim 1, wherein said plastic is selected from the group consisting of said polyolefins and said fluorocarbons resins and are applied to said polyester film by extrusion coating, wherein said plastic is not stretch-oriented.

17. The sail as recited in claim 1, wherein said composite consists essentially of one layer of said heat-set polyester film, and one layer of said plastic.

18. The sail as recited in claim 1, wherein said plastic comprises a polyester.

19. The sail as recited in claim 1, wherein said plastic comprises a polyvinyl chloride.

20. The sail as recited in claim 1, wherein said plastic comprises a fluorocarbon resin.

21. A sail for sports equipment, constructed of a multilayered composite material containing at least three layers, said layers comprising a stretch-oriented and heat-set polyester film layer which is bonded on both surfaces by a plastic layer selected from the group consisting of polyolefin, polyamide, polyester, polyvinylchloride, and fluorocarbon resin.

22. The sail as recited in claim 21, wherein said composite consists essentially of one layer of said heat-set polyester film, and two layers of said plastic.

23. A sail for sports equipment, constructed of a multilayered composite material containing at least four layers, said layers comprising at least two stretch-oriented and heat-set polyester film layers and at least two plastic layers selected from the group consisting of polyolefin, polyamide, polyester, polyvinylchloride, and fluorocarbon resin, wherein said polyester film layers and said plastic layers are alternating in the composite.

24. The sail as recited in claim 23, wherein said composite consists essentially of two layers of said heat-set polyester film, and two layers of said plastic.

* * * * *